M. B. CRANE & W. H. MILLS.
MATCH SCRATCHING ATTACHMENT.
APPLICATION FILED MAR. 29, 1916.
1,238,270.  Patented Aug. 28, 1917.
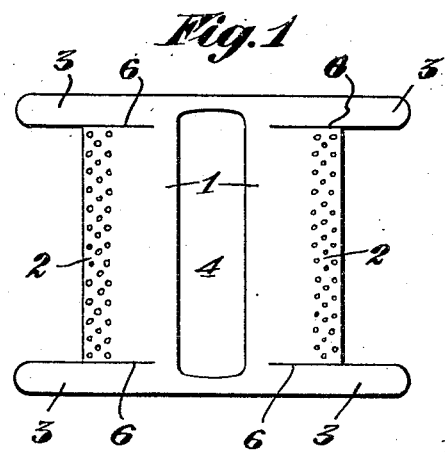
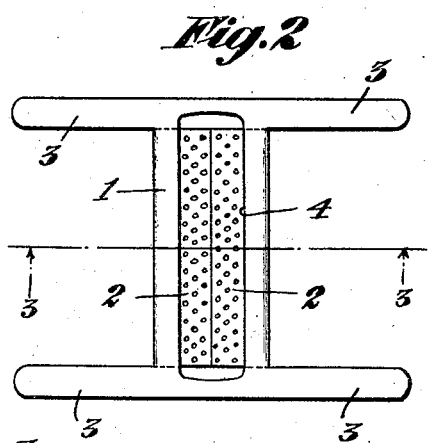
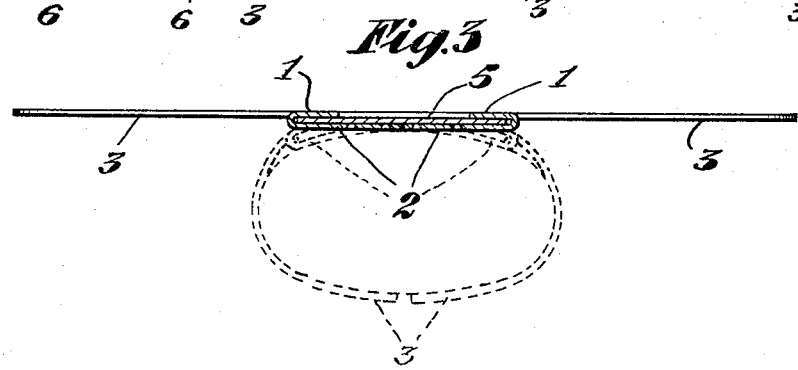
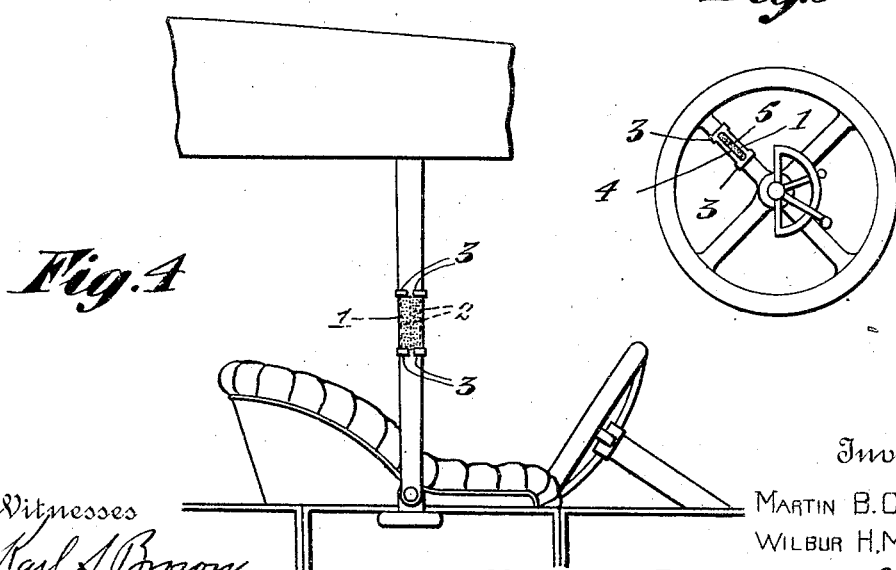
Witnesses
Karl A Brown.
Sylvia B Eaton
Inventors
Martin B. Crane
Wilbur H. Mills
By Reynolds & Sproll
Attorneys

UNITED STATES PATENT OFFICE.

MARTIN B. CRANE AND WILBUR H. MILLS, OF SEATTLE, WASHINGTON.

MATCH-SCRATCHING ATTACHMENT.

1,238,270.  Specification of Letters Patent.  Patented Aug. 28, 1917.

Application filed March 29, 1916. Serial No. 87,622.

*To all whom it may concern:*

Be it known that we, MARTIN B. CRANE and WILBUR H. MILLS, citizens of the United States, and residents of the city of Seattle, county of King, State of Washington, have invented certain new and useful Improvements in Match-Scratching Attachments, of which the following is a specification.

Our invention relates to a device designed for attachment to various parts of a vehicle, such as an automobile or other objects under similar conditions, for the purpose of providing a surface upon which matches may be conveniently struck.

The object of our invention is to provide a device which may be easily attached to any bar or rod, and which will provide a convenient and effective surface upon which matches may be struck. thereby adding to the convenience of people who are using the vehicle, and also preventing scratching the finished surfaces thereof.

Our invention comprises the novel features and combinations which will be hereinafter described, and then particularly pointed out in the claims. In the accompanying drawings we have shown the form of construction which is now preferred by us.

Figure 1 is a face view of the sheet of metal from which the device is formed.

Fig. 2 is a view of the device in its completed form, but before attachment.

Fig. 3 shows an edge view of the device in the condition shown in Fig. 2, and in dotted lines the position assumed when applied to a bar.

Fig. 4 shows the application of the device to a bow supporting an automobile top.

Fig. 5 shows the manner of attaching the device to the handle of a steering wheel of an automobile.

This device is made of a thin sheet of metal or similar material, shaped and bent into the desired form. The appearance of the sheet after shaping but before bending, is shown in Fig. 1.

At each side of a central body 1 ears 2 are formed, these being severed from the securing arms 3, located at each end of the device along the lines 6. These ears 2 are bent backward and over into parallelism with the central body 1, and preferably slightly spaced therefrom, in order that a sheet of scratching material, as sandpaper, may be inserted between them if desired.

The central body 1 is provided with a hole 4 extending most of the way across the sheet, of sufficient width as to provide sufficient scratching space between its edges.

The portions of the ears 2 which are outermost in the condition shown in Fig. 1, and which are toward the center in the completed article, are preferably roughened so as to constitute an effective scratching surface, as is indicated in Figs. 1 and 2. This roughening may be done by a large number of fine pointed punches, which project small points.

At each end of the ears 2, securing arms 3 are formed, which may be bent to encircle an object, such as the supporting bar of an automobile top, or the spoke of a steering wheel of an automobile, or in fact any bar of suitable size.

A pocket formed between the ears 4 and the central body 1, may receive a strip of sandpaper, which strip may be renewable from time to time as desired. If the ears are in addition punched as described, they will serve as effective scratching surfaces if, and when the sandpaper has been worn out and removed, until a new piece of sandpaper may be inserted.

In using this device it is placed against a suitable bar, and the arms 3 are bent about said bar, thereby securing it in place.

The device may thus be quickly and easily secured in place without using any tools, and may also be readily removed when desired without requiring tools.

What we claim as our invention is:

1. A match scratching attachment composed of a metal plate having ears bent backward from opposite sides of a central body section to form a thin pocket, the central body having a hole exposing a material part of said ears, and securing arms extending from said body section.

2. A match scratching attachment composed of a metal plate having ears bent back from opposite sides and into separated parallelism with a central body section, and having securing arms extending from the body section at each end of said ears, the central body section having a hole exposing a material part of the inner surface of said ears.

3. A match scratching attachment composed of a metal plate having ears bent back from opposite sides and into separated parallelism with a central body section, and having securing arms extending from the body section at each end of said ears, the central body section having a hole exposing a material part of the inner surface of said ears, the exposed surfaces of said ears being roughened.

Signed at Seattle, Washington, this 23rd day of March, 1916.

MARTIN B. CRANE.
WILBUR H. MILLS.

Copies of this patent may be obtained for five cents each, by addressing the "Commissioner of Patents, Washington, D. C."